United States Patent [19]
Farrell et al.

[11] Patent Number: 5,666,208
[45] Date of Patent: Sep. 9, 1997

[54] PRINTING SYSTEM WITH ELECTRONIC LIGHT TABLE FUNCTIONALITY

[75] Inventors: Michael E. Farrell, Ontario; Randall R. Hube, Rochester, both of N.Y.

[73] Assignee: Xerox Corporation, Stamford, Conn.

[21] Appl. No.: 585,028

[22] Filed: Jan. 11, 1996

[51] Int. Cl.[6] .......................... H04N 1/387; G03G 21/00
[52] U.S. Cl. .......................... 358/296; 358/452; 399/81; 399/364
[58] Field of Search .......................... 358/296, 300, 358/448, 452, 527, 537; 355/24, 77; 382/309; 399/81, 364

[56] References Cited

U.S. PATENT DOCUMENTS

| | | | |
|---|---|---|---|
| 4,887,129 | 12/1989 | Shenoy et al. | 358/300 X |
| 4,897,803 | 1/1990 | Calarco et al. | 364/518 |
| 5,182,796 | 1/1993 | Shibayama et al. | 399/81 X |
| 5,191,429 | 3/1993 | Rourke | 358/296 |
| 5,271,065 | 12/1993 | Rourke et al. | 382/1 |
| 5,355,420 | 10/1994 | Bloomberg et al. | 382/46 |
| 5,422,743 | 6/1995 | Farrell et al. | 358/537 |
| 5,450,541 | 9/1995 | Rourke et al. | 395/155 |
| 5,481,353 | 1/1996 | Hicks et al. | 358/452 X |

FOREIGN PATENT DOCUMENTS 2198566  12/1987  United Kingdom ............ G06F 15/21

*Primary Examiner*—Eric Frahm
*Attorney, Agent, or Firm*—Gary B. Cohen

[57] ABSTRACT

A method of registering images on a user interface with a screen display in which separate electronic pages corresponding respectively with the first and second sides of an electronic duplex page are displayed on the user interface screen display simultaneously with a first image on the first side being disposed in a first position and a second image on the second side being disposed in a second position. The second image is moved on the screen display, relative to the first image so that the second image is disposed in the first position and is aligned with respect to the first image in a selected aligned relationship. Each of the separate electronic pages has a transparent background so that substantial portions of the second image are visible on the screen display even when the first image is superposed with respect to the second image. As a result of positioning the first and second images on the screen display, a hardcopy duplex print, reflecting the selected aligned relationship obtained through moving the second image on the screen display, is producible.

18 Claims, 13 Drawing Sheets

PRINTING SYSTEM WITH ELECTRONIC LIGHT TABLE FUNCTIONALITY

The present invention relates generally to a technique for employment in a document processing system with a user interface having a screen display and, more particularly, to an implementation for an electronic light table in which an electronic stack of electronic pages is shown on the screen display with the pages being disposed in an overlapping relationship so that 1) at least one image can be registered relative to one or more other images, some of which images may be shown as reversed for the sake of printing the same on the back-sides of substrates, and/or 2) one or more pages can be edited to improve output quality thereof.

Electronic printing systems typically include an input section, often referred to as an input image terminal ("IIT"), a controller, often referred to as an electronic subsystem ("ESS") and an output section or print engine, often referred to as an image output terminal ("IOT"). In one type of electronic printing system, manufactured by Xerox® Corporation, known as the DocuTech® electronic printing system, an electronic master or job can be inputted to the printing system from, among other sources, a network or a scanner. An example of a printing system with both network and scanner inputs is found in the following patent:

U.S. Pat. No. 5,170,340

Patentees: Prokop et al.

Issued: Dec. 8, 1992

One advantage of an electronic printing system resides in its ability to afford high levels of editing capability in which stored images can be displayed and manipulated with respect to one another. In one known example, as disclosed by U.S. Pat. No. 5,450,541 to Rourke et al., a first image is merged relative to a second image at a selected location in the second image. In another known example, as disclosed by UK Patent Application 2,198,566A, formatted data on a document designated for printing is merged with electronically generated forms and optional masks.

Another advantage of an electronic printing system resides in its ability to shift or rotate an image and then store the same for subsequent output. In one known example, as disclosed by U.S. Pat. No. 5,191,429 to Rourke, images on the back side of a duplex print are automatically shifted so that all of such back side images fit on the back side of the page. In another known example, as disclosed by U.S. Pat. No. 5,271,065 to Rourke et al., a spacing or gutter region between image pairs on signatures of a signature booklet is increased automatically as a function of a position of each signature in the booklet. As follows from the disclosure of U.S. Pat. No. 5,355,420 to Bloomberg et al., small and large angle rotations are performable with electronic printing machines.

Yet another advantage of an electronic printing system resides in its ability to overlay a first image relative to a second image. An example of the sort of technology that makes overlay functionality possible in electronic printing systems, is disclosed by U.S. Pat. No. 4,897,803 to Calarco et al. As is known, publicly available electronic reprographic systems make this overlay feature, in which the first image is superposed on the second image and the second image can be "seen through" the first image, possible.

Through much of the 20th century, draftspeople, engineers and others have aligned, images through use of physically superposing one image relative to another in an arrangement commonly referred to as a "light table". It is contemplated that a light table could be used conjunctively with an electronic printing system in that stored images could be printed and one or more hardcopy pages could be superposed relative to one or more other hardcopy pages. In particular, an operator would register output sheets and visually check image alignment or registration by backlighting or fanning the sheets. This approach is disadvantageous in that:

the cumulative opacity of the paper stock used for proof sheets limits the number of pages that can be registered relative to one another;

this approach wastes paper;

physical manipulation of the proof sheets is time consuming and iterative (trial and error); and for a dupexed page, manipulation of the back side image relative to the front side image is not possible.

It would be desirable to provide a light table technique that both eliminates the need to manipulate physical pages on a table and permits easy viewing of images relative to one another even when a plurality of images are registered in a stack of pages. That is, it would be desirable to provide a wholly electronic light table that makes alignment of stored images both quick and easy.

In accordance with one aspect of the present invention, there is provided a method for a printing machine including a duplex print producing subsystem for producing duplex prints, a memory for storing images, and a user interface with a screen display, the screen display being configured as an electronic light table for displaying multiple images in superposed relationship. The method, which contemplates the production of a duplex print having a first side with a first image disposed thereon and a second side with a second image disposed thereon where each of the first and second sides are represented, in memory, as a separate electronic page, includes: a) using the electronic light table configuration, displaying the first and second sides of the electronic page on the user interface screen display simultaneously with the first image being disposed in a first position and the second image being disposed in a second position; b) moving the second image, on the screen display, relative to the first image so that the second image is disposed in visual registration with respect to the first position and a selected aligned relationship exists between the first image and the second image, each of the separate electronic pages having a transparent background so that substantial portions of the second image are visible even when the first image is superposed with respect to the second image; and c) producing a hardcopy duplex print, as controlled by the moving of said b), the hardcopy duplex prints including the first and second images with the first and second images respectively assuming the first position, as set in said b), so that the selected aligned relationship is obtained in the duplex print.

In accordance with another aspect of the present invention, there is provided a method for a printing machine including a memory for storing an electronic document with a plurality of electronic pages and a user interface with a screen display, each of the plurality of pages including an image and the screen display being configured as an electronic light table for displaying the plurality of images in superposed relationship. The method, which contemplates the processing of each of the plurality of images to optimize the viewing thereof, includes: a) assigning an image appearance factor to each of the plurality of images stored in memory; b) displaying the plurality of images on the screen display simultaneously in a sequential order, each electronic page, except for the last electronic page, being superposed relative to another one of the plurality of electronic pages so that the electronic document is displayed as an electronic stack of electronic pages, and each electronic page having a transparent background so that portions of the image of each electronic page, except the first electronic page, can be seen through each overlying electronic page; and c) applying each image appearance factor assigned in said a) with its corresponding image, in the plurality of image, so that, during said b), each image in the displayed electronic stack is visually distinct from substantially all of the other images in the displayed electronic stack.

In accordance with yet another aspect of the present invention, there is provided a method for a printing machine including a memory for storing an electronic document with a plurality of electronic pages and a user interface with a screen display, each of the electronic pages including an image and the screen display being configured as an electronic light table for displaying the plurality of images in superposed relationship. The method, which contemplates processing the electronic document with the electronic light table and a second image stored in the memory, includes: a) displaying the plurality of images on the display screen simultaneously in a sequential order, each electronic page, except for the last electronic page, being superposed relative to another one of the plurality of electronic pages and the electronic document being displayed as an electronic stack of electronic pages, and each electronic page having a transparent background so that portions of the image of each electronic page, except the first electronic page can be seen through each overlying electronic page; b) applying the second image to at least a portion of the displayed electronic stack on the screen display; and c) editing one or more of the electronic pages in the displayed electronic stack on the basis of information obtained by applying the second image to the displayed electronic stack in said b).

These and other aspects of the invention will become apparent from the following description, the description being used to illustrate a preferred embodiment of the invention when read in conjunction with the accompanying drawings.

Figure 1:
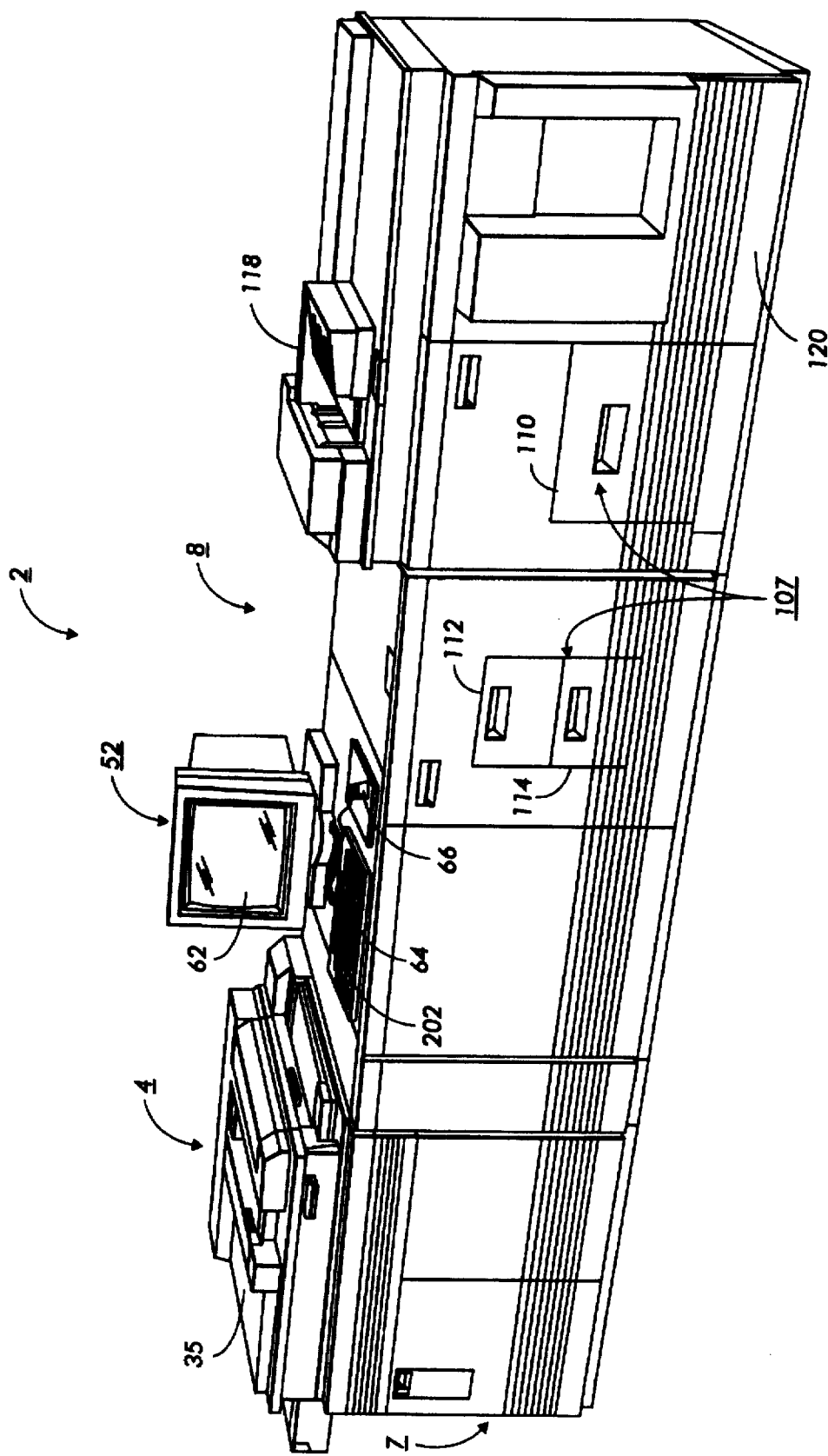
FIG. 1 is a view depicting an electronic printing system appropriate for implementing the electronic light table of the present invention.
Figure 3:
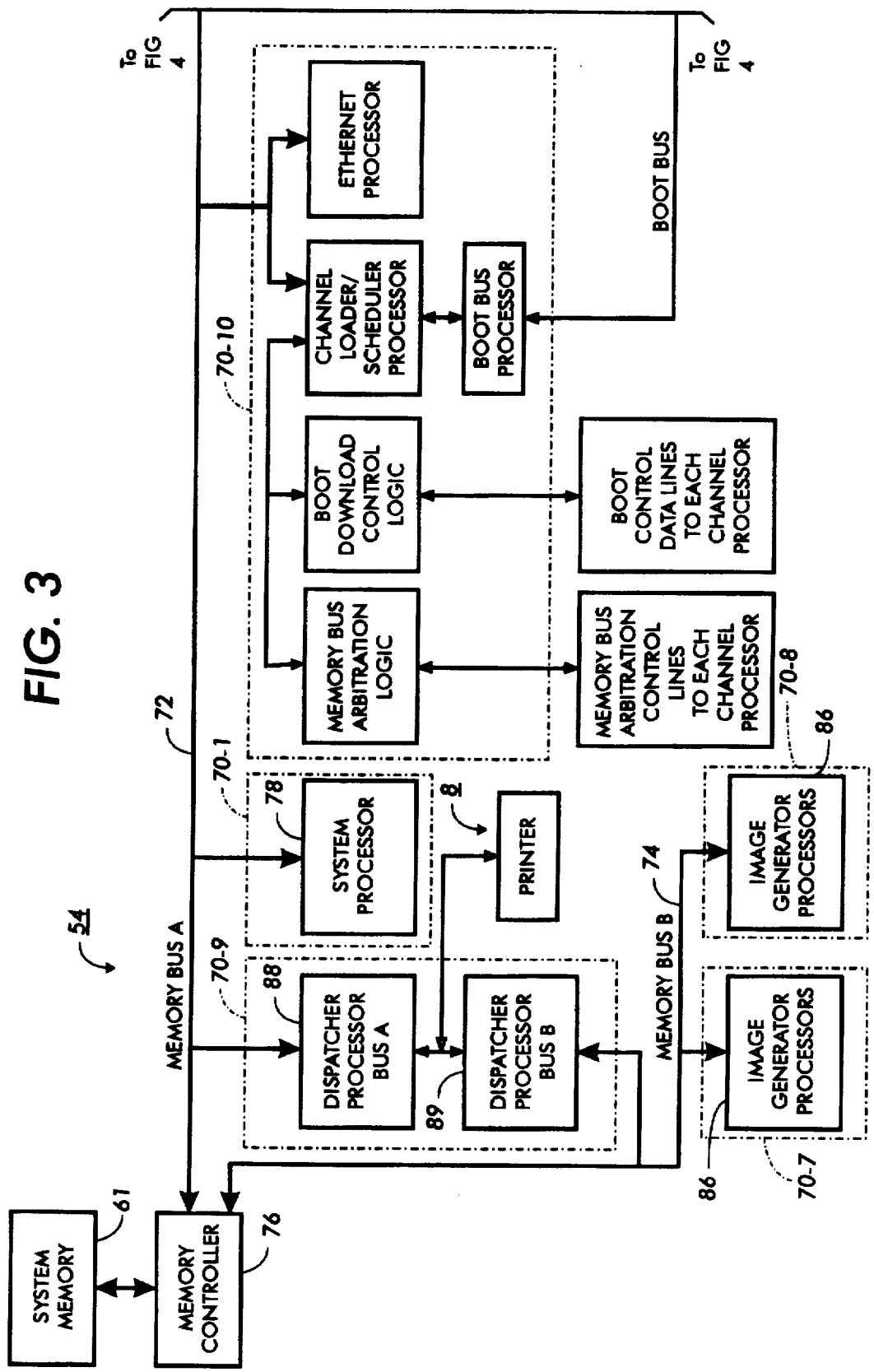
Figure 4:
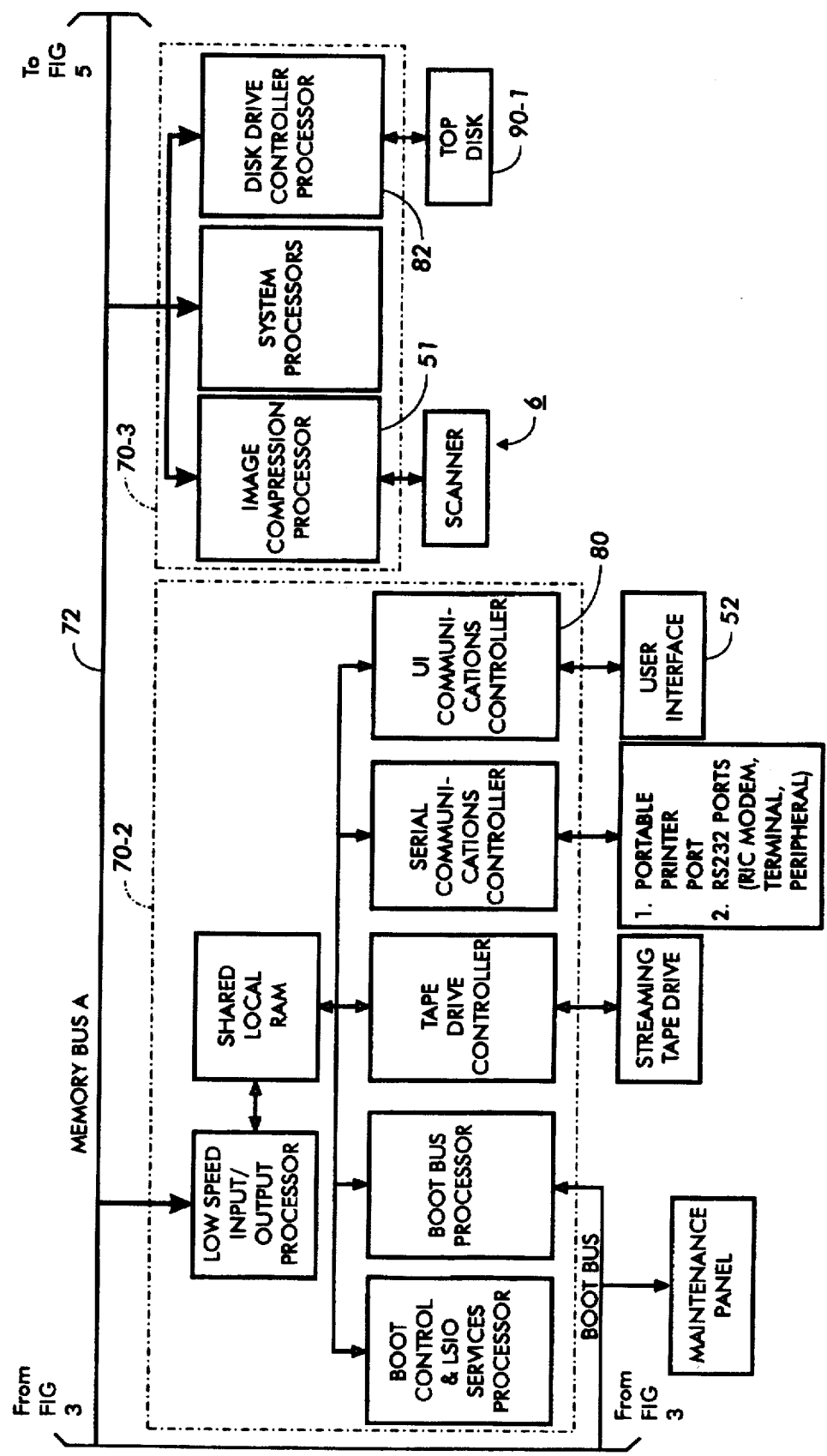
Figure 5:
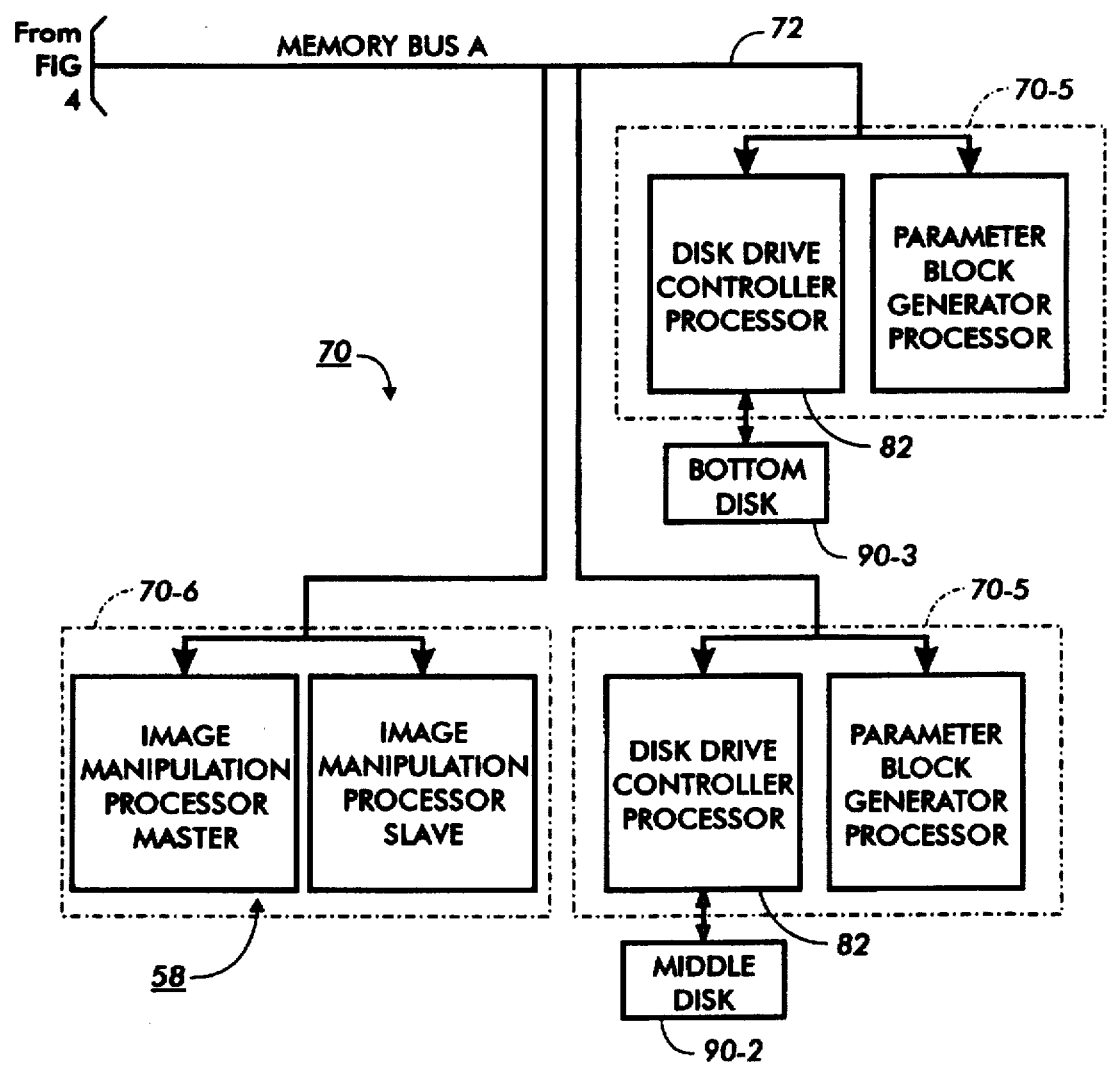
Figure 6:
Figure 7:
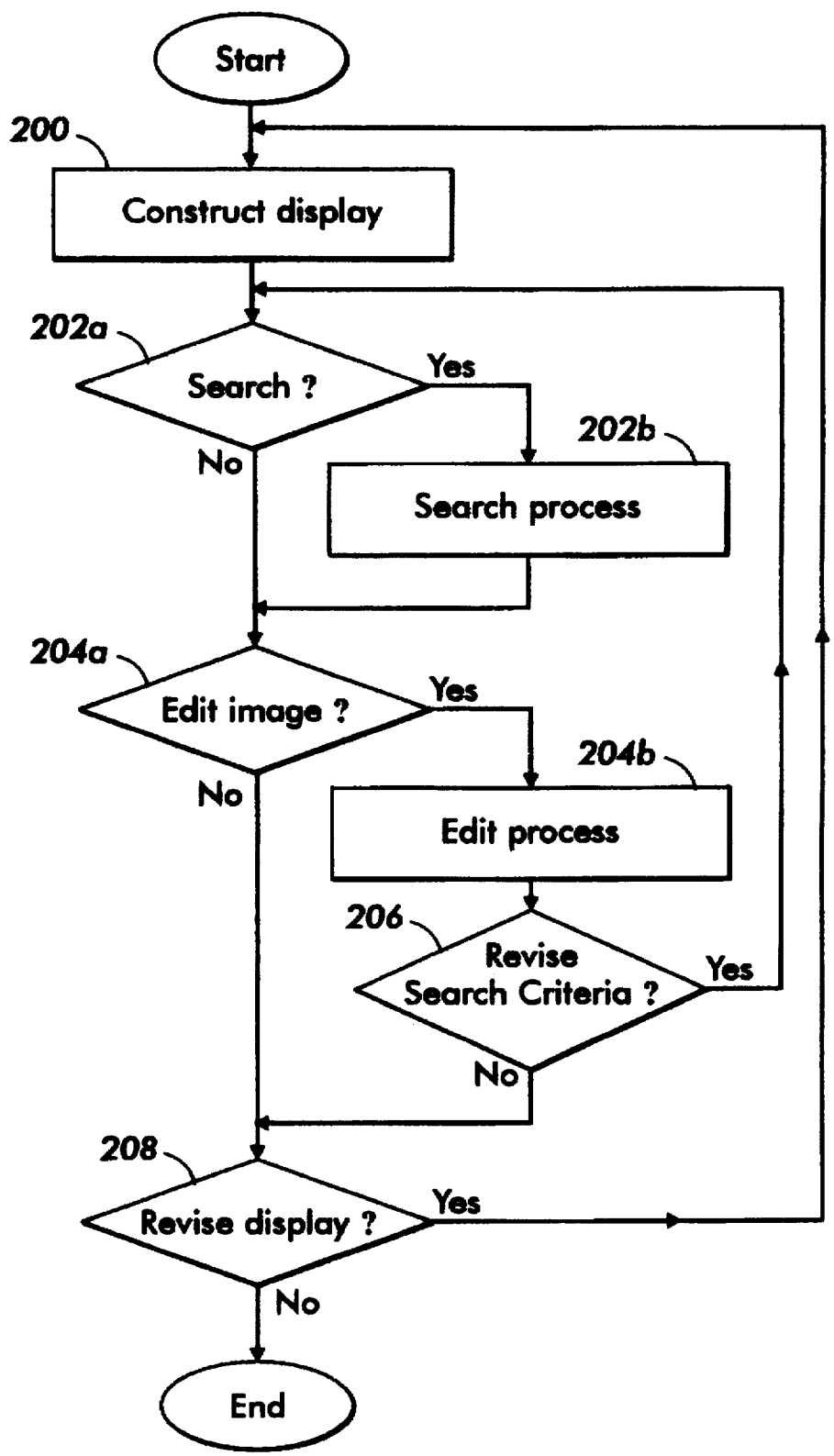
Figure 8:
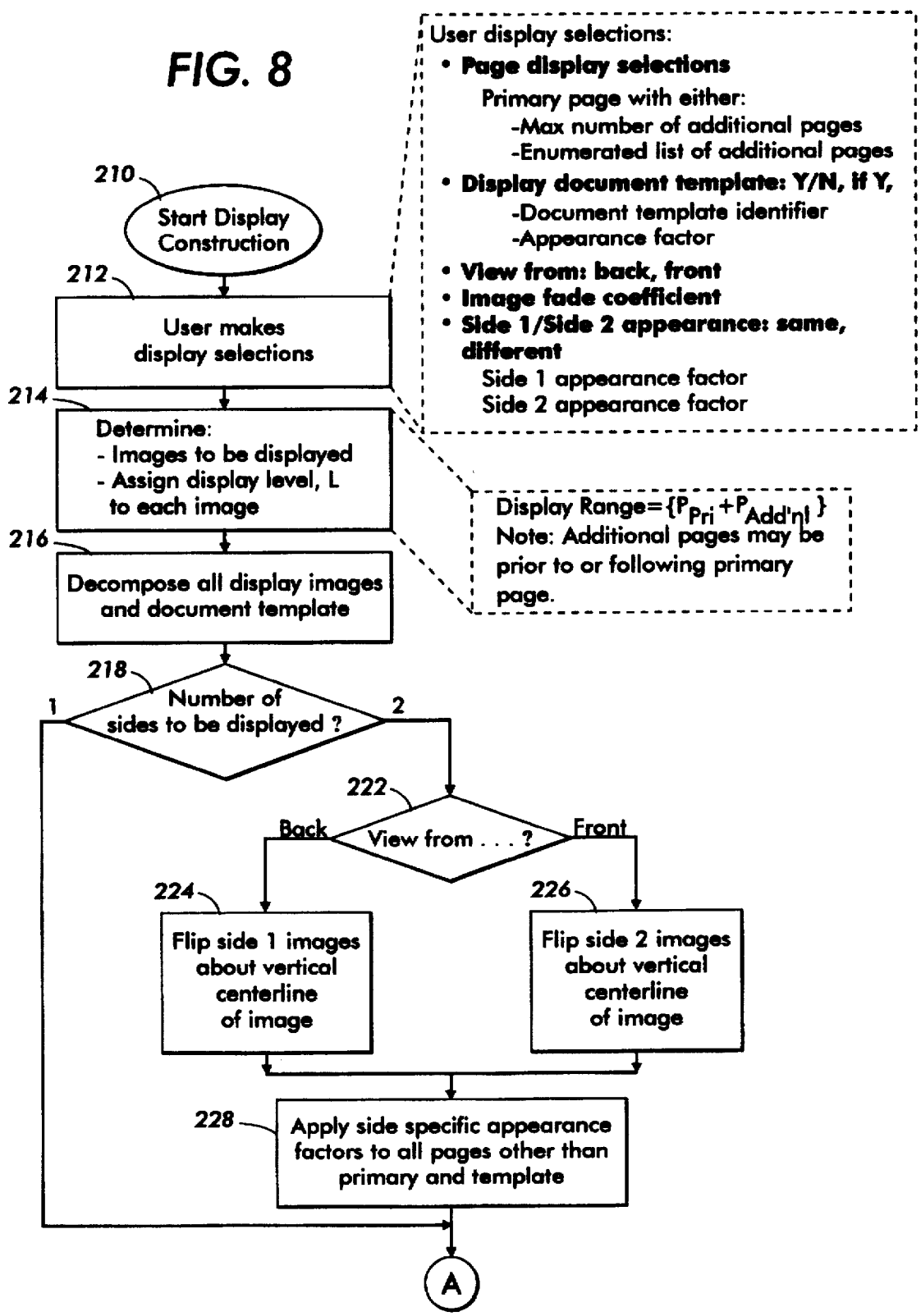
Figure 9:
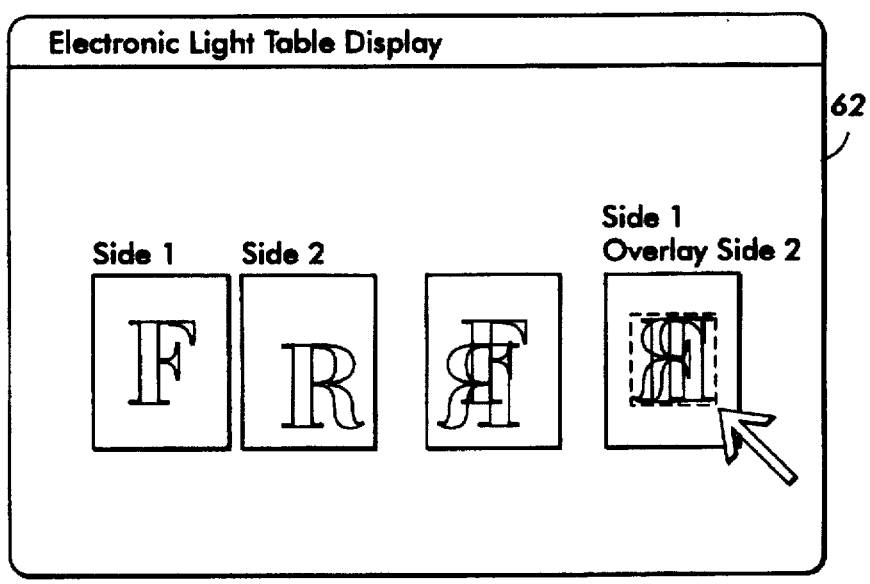
Figure 10:
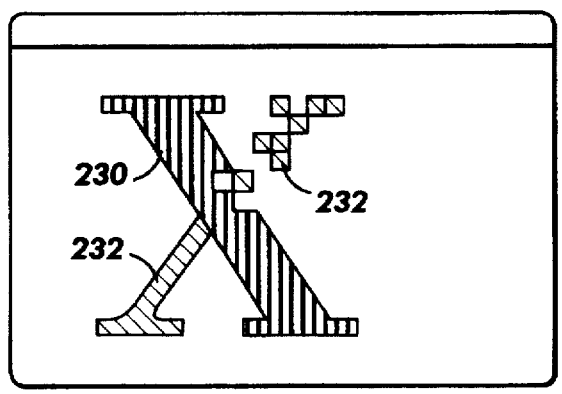
Figure 12:
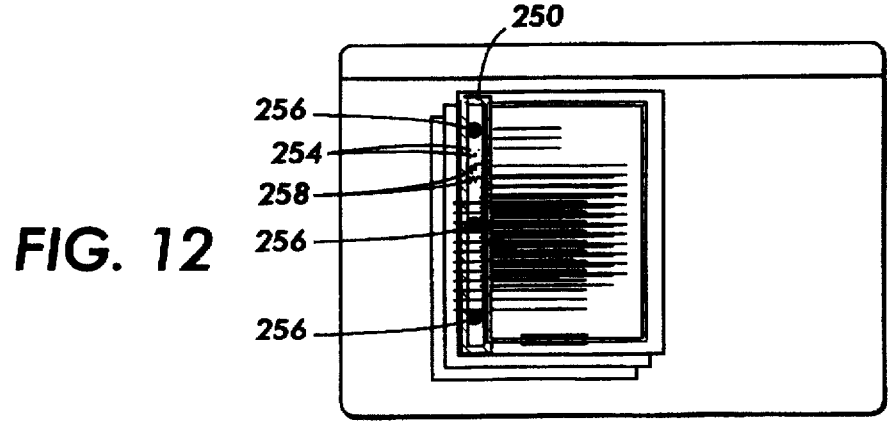
Figure 11:
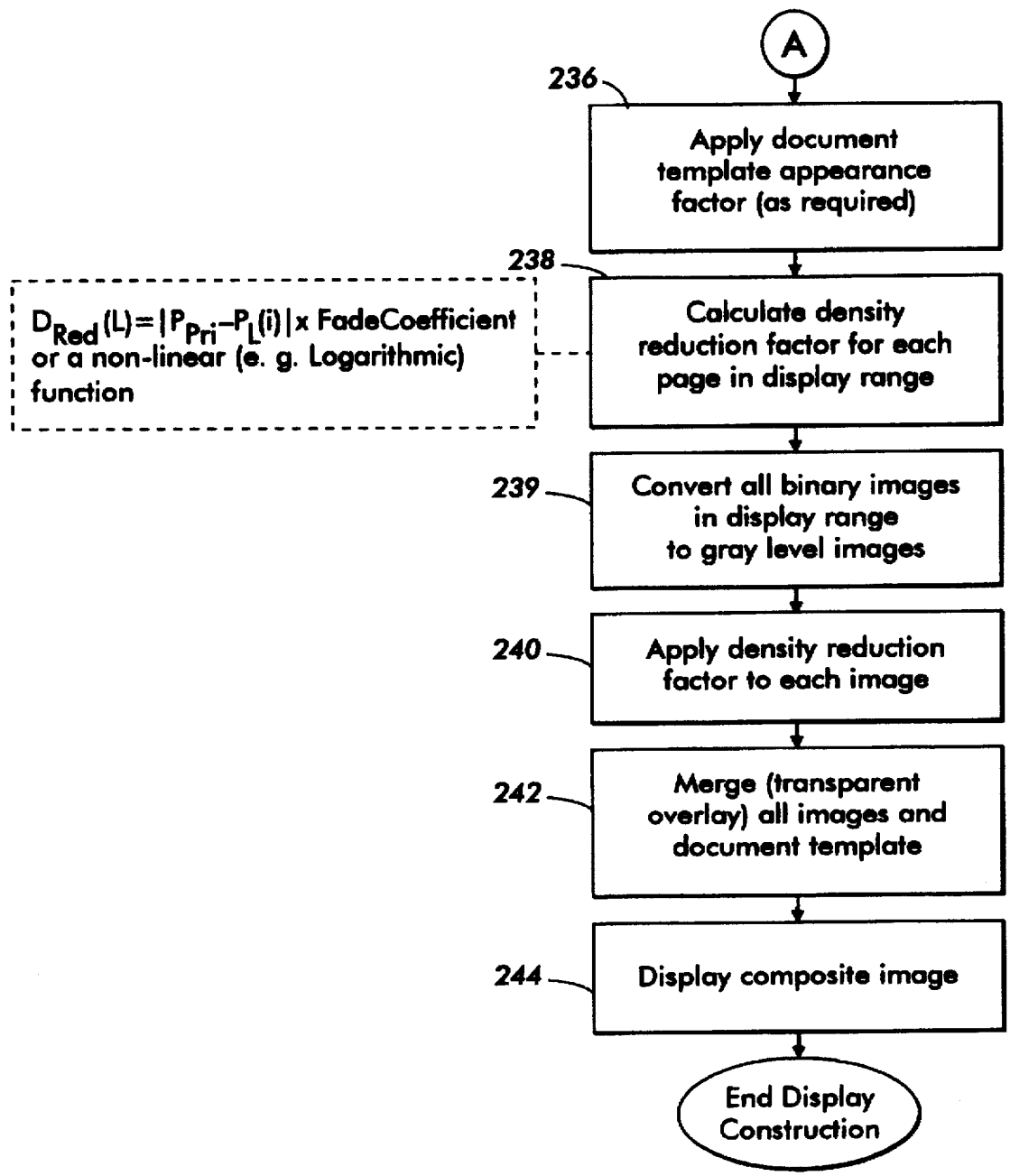
Figure 13:
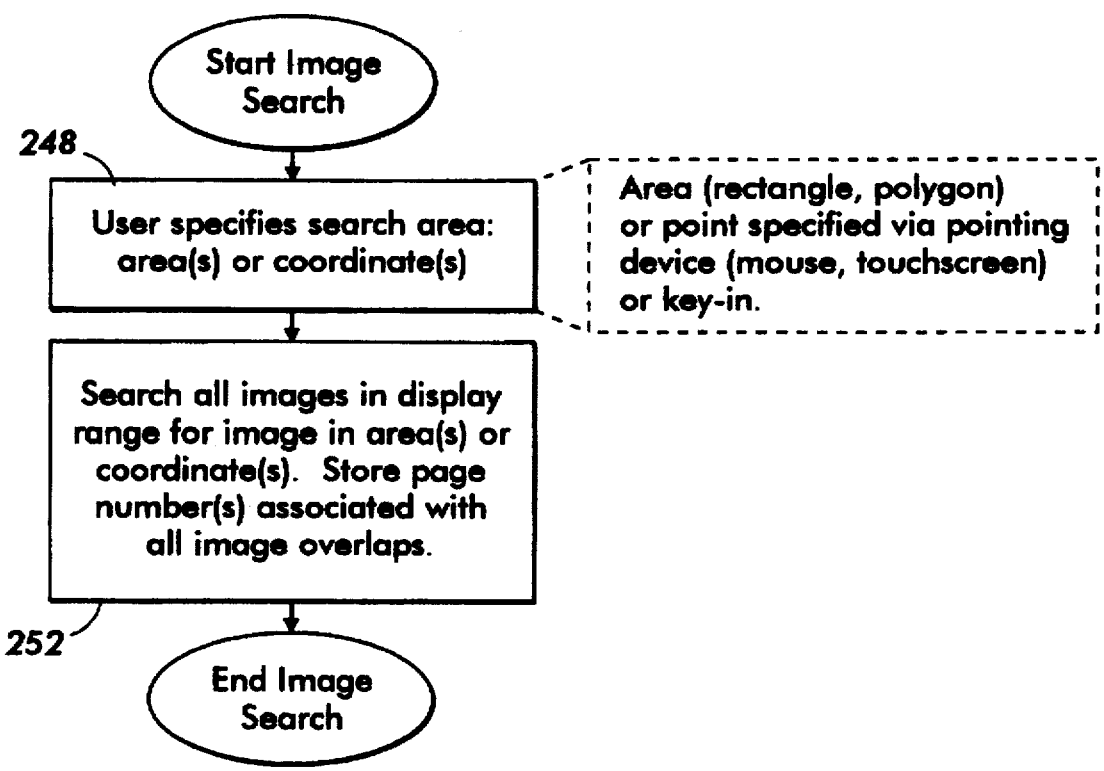
Figure 14:
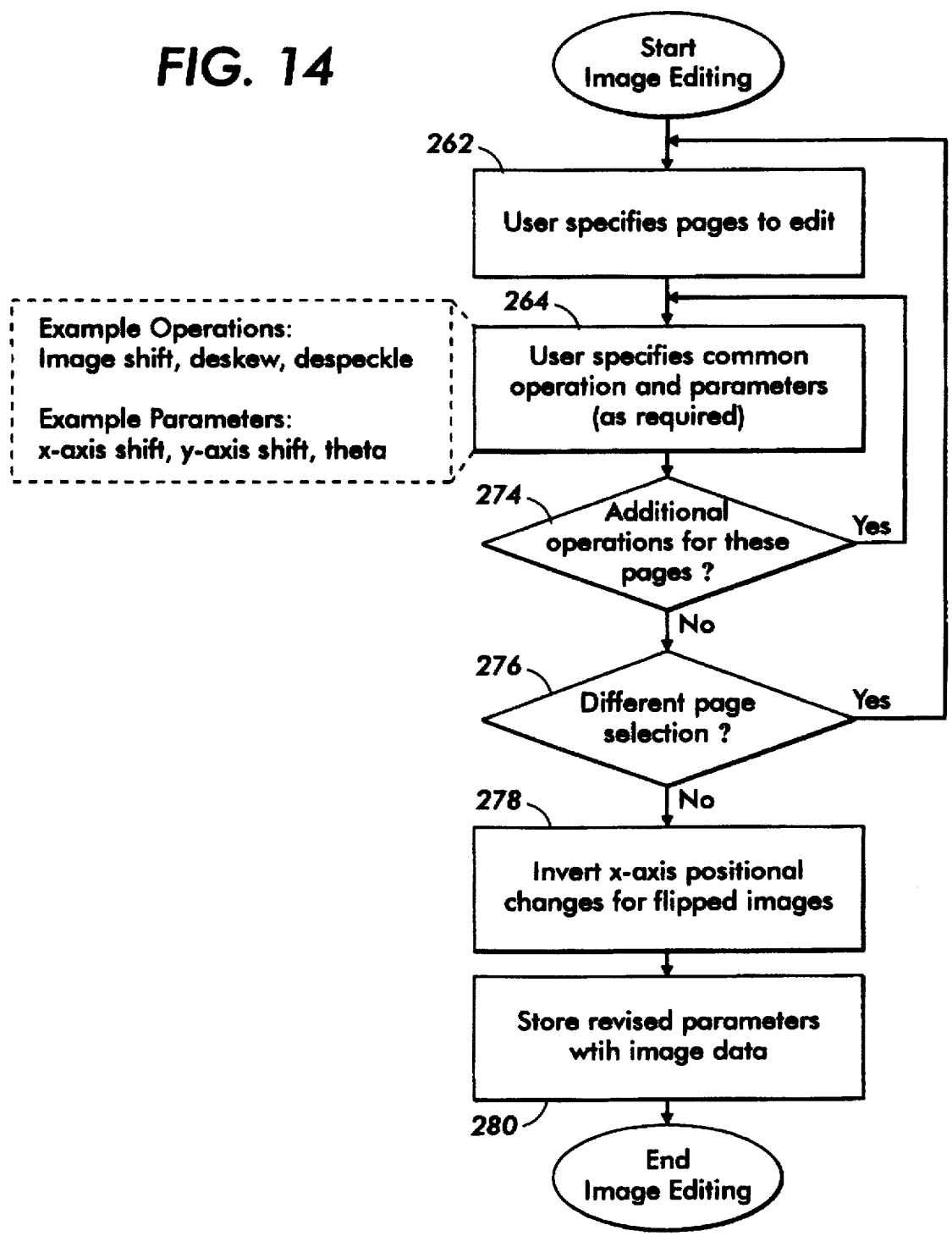
Figure 15:
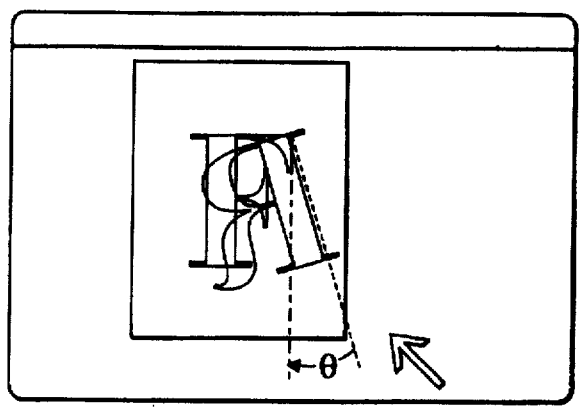
Figure 16:
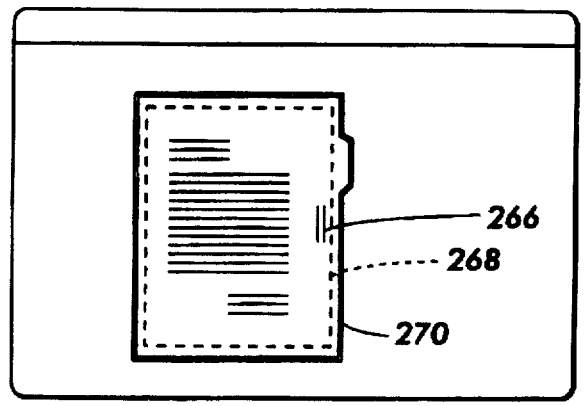
Figure 17:
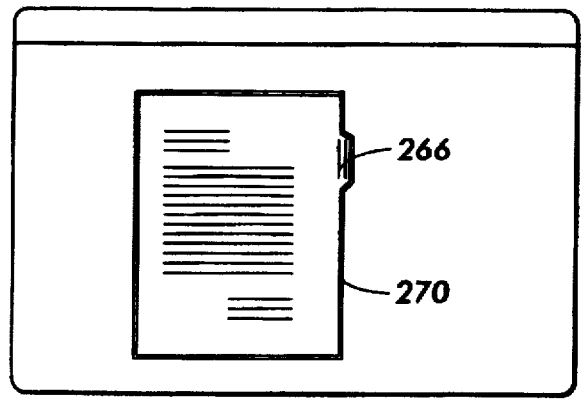

FIGS. 3–5 comprise a schematic block diagram showing the major parts of the control section for the printing system shown in FIG. 1;

FIG. 6 is a view depicting an exemplary job programming ticket and job scorecard displayed on the User interface (UI) touchscreen of the printing system shown in FIG. 1, the job ticket and job scorecard being associated with a job to be printed;

FIG. 7 is a flow diagram illustrating an overview of a method for processing at least a portion of an electronic document with an electronic light table;

FIG. 8 is a flow diagram illustrating a first portion of a subroutine for constructing a display of the portion of the electronic document in the electronic light table;

FIG. 9 is an elevational view of a screen display upon which a plurality of images are shown as being manipulated in the electronic light table;

FIG. 10 is an elevational view of the screen display in which two images, each being processed in accordance with separate side appearance factors, are shown in superposed relationship;

FIG. 11 is a flow diagram illustrating a second portion the constructing subroutine referred to in FIG. 8;

FIG. 12 is an elevational view of the screen display in which an electronic stack of electronic pages is shown with a searching template being applied thereto;

FIG. 13 is a flow diagram illustrating a subroutine for searching the stack of electronic pages shown in FIG. 12;

FIG. 14 is a flow diagram illustrating a subroutine for editing an electronic stack of electronic pages;

FIG. 15 is an elevational view of the screen display in which one image is shown as being rotated relative to another image;

FIG. 16 is an elevational view of the screen display in which a template is shown as being applied to a subject image; and FIG. 17 is an elevational view of the screen display in which a portion of the subject image is shown as being shifted relative to the applied template.

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 2:
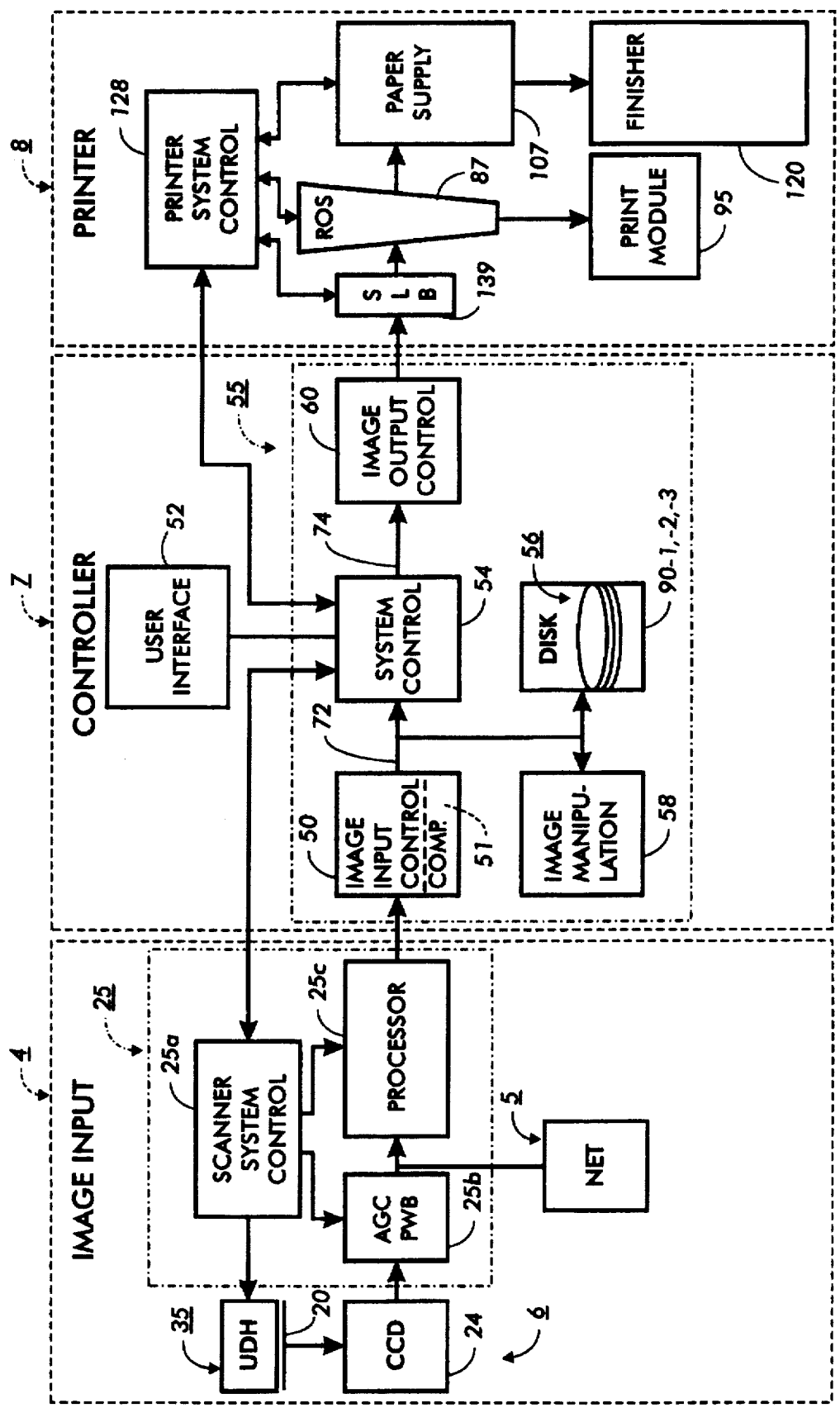
FIG. 2 is a block diagram depicting the major elements of the printing system shown in FIG. 1.

Referring to the drawings where like reference numerals designate identical or corresponding parts throughout the several views, and more particularly to FIGS. 1 and 2, there is shown an exemplary image printing system 2 for processing print jobs in accordance with the teachings of the present invention. Printing system 2, for purposes of explanation, is divided into image input section 4, controller section 7, and printer section 8. In the example shown, the image input section 4 has both remote and on-site image inputs, enabling system 2 to provide network, scan, and print services. Other system combinations may be envisioned such as a stand alone printing system with on-site image input (i.e., a scanner), controller, and printer; a network printing system with remote input, controller, and printer; etc.

While a specific printing system is shown and described, the present invention may be used with other types of printing systems. For example, printer section 8 may instead use a different printer type such as ink jet, ionographic, thermal, photographic, etc., and, furthermore, may be incorporated in electronic display systems, such as CRTs, LCDs, LEDs, etc. or else other image scanning/processing/recording systems, or else other signal transmitting/receiving, recording systems, etc. as well.

For off-site image input, image input section 4 has a network 5 with a suitable communication channel such as an EtherNet® connection enabling image data in the form of image signals or pixels from one or more remote sources to be input to system 2 for processing. Where the Page Description Language (PDL) of the incoming imaging data is different than the PDL used by system 2, suitable conversion means (not shown) are provided. Other remote sources of image data such as streaming tape, floppy disk, video camera, etc. may be envisioned.

For on-site image input, section 4 has a document scanner section 6 with a Universal Document Handler (UDH) 35 for the purpose of automatically and sequentially placing and locating sets of multiple documents for scanning. Scanner section 6 incorporates one or more linear light sensitive arrays 24 for reciprocating scanning movement below platen 20 and focused on a line-like segment of platen 20 and the document being scanned thereon. Array 24, which may utilize Charge-Coupled Device (CCD) technology or the like, provides image elemental signals or pixels representative of the image scanned which are input to processor 25 for processing.

Processor 25 communicates with the controller section 7 and includes a scanner system control 25a, an automatic gain control printing wiring board (AGCPWB) 25b, and a processor 25c. AGCPWB 25b converts the analog image signals output by array 24 to digitally represented facsimile signals and processor 25c processes the digital image signals as required to enable controller section 7 to store and handle the image in the form and order required to carry out the job programmed. After processing, the image signals are output to controller section 7. Image signals derived from net 5 are similarly input to processor 25c.

Processor 25c also provides enhancements and changes to the image signals such as filtering, thresholding, screening, cropping, scaling (reduction/enlargement), etc. Following any changes and adjustments in the job program which affect these image processing parameters, the document must be rescanned to capture the specified modification.

Printer section 8 comprises a laser type printer having a Raster Output Scanner (ROS) 87, Print Module 95, Paper Supply 107, Finisher 120, and Printer System Control 128. ROS 87 has a two beam laser with the beams modulated in accordance with the content of an image signal input by acousto-optic modulator to provide dual imaging beams which are scanned across a moving photoreceptor of Print Module 95 by means of a rotating polygon. This exposes two image lines on the photoreceptor with each scan to create the latent electrostatic images represented by the image signal input to the modulator.

The latent electrostatic images are developed and transferred to a print media delivered by paper supply 107. As will be appreciated by those skilled in the art, print media can comprise a selected one of various known substrates which are capable of accepting an image, such substrates including transparencies, preprinted sheets, vellum, glossy covered stock, film or the like. The print media may comprise any of a variety of sheet sizes, types, and colors, and for this, plural media supply trays 110, 112, 114 (FIG. 1) are provided. The transferred image is permanently fixed or fused and the resulting prints discharged to either output tray 118 (FIG. 1), or to finisher 120. Finisher 120 provides certain finishing selections such as a stitcher for stitching or stapling the prints together to form books, a thermal binder for adhesively binding the prints into books, and/or other finishing options such as slitting, perforating, saddle stitching, folding, trimming, or the like.

Printer system control 128 (FIG. 2) automatically and precisely controls all the printer functions and operations in accordance with job program parameters received from system control 54 of controller section 7, as well as from internally derived signals from sensors and processes within the printer section 8. Printer system control signals are derived and distributed via a plurality of printed wiring boards (PWBs) in a multi-processor architecture characterized by multiple microprocessor controller cores, serially interconnected, and also serially linked to more numerous input/output processing circuit PWBs. Controller section 7 is, for explanation purposes, divided into an image input control 50, User Interface (UI) 52, system control 54, main memory 56, image manipulation section 58, and image output control 60. The units 50, 54, 56, 58, 60 comprise a system which may also generally be referred to as the "Electronic Subsystem" (ESS).

The scanned image data input from processor 25c of scanner section 6 to controller section 7 is compressed by image compressor/processor 51 of image input control 50 and placed in an image file. Image files, which represent different print jobs, are temporarily stored in system memory 61 (seen in FIG. 3) pending transfer to main memory 56 where the data is held pending use.

Referring again to FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, and to obtain system operating information, visual document facsimile display, programming information and icons, diagnostic information and pictorial views, etc. Items displayed on touchscreen 62 such as files and icons are actuated by either touching the displayed item on screen 62 with a finger, or by using mouse 66 to point cursor 67 (seen in FIG. 6) to the item selected and keying the mouse.

Main memory 56 (FIG. 2) has plural hard disks 90-1, 90-2, 90-3 for storing machine Operating System software, machine operating data, and the scanned image data currently being processed. When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 where the additional processing steps such as collation, make ready (document editing), decomposition, rotation, etc., are carried out. Following processing, the data may be returned to main memory 56, sent to UI 52 for display on touchscreen 62, or sent to image output control 60.

Referring particularly to FIGS. 3A-3C, image data output to image output control 60 is decompressed and readied for printing by image generating processors 86 of PWBs 70-7, 70-8. Following this, the data is output by dispatch processors 88, 89 on PWB 70-9 via Scan Line Buffer (SLB) 139 (FIG. 2) to printer section 8. Image data sent to printer section 8 for printing is normally purged from memory 56 to make room for new image data.

Control section 7 includes a plurality of Printed Wiring Boards (PWBs) 70 (FIGS. 3A-3C), PWBs 70 being coupled with one another and with System Memory 61 by a pair of memory buses 72, 74. A memory controller 76 couples System Memory 61 with buses 72, 74. PWBs 70 include system processor PWB 70-1 having plural system processors 78; low speed I/O processor PWB 70-2 having UI communication controller 80 for transmitting data to and from UI 52; PWBs 70-3, 70-4, 70-5 having disk drive controller/processor 82 for transmitting data to and from disks 90-1, 90-2, 90-3 respectively of main memory 56 (image compressor/processor 51 for compressing the image data is on PWB 70-3); image manipulation PWB 70-6 with image manipulation processors of image manipulation section 58; image generation processor PWBs 70-7, 70-8 with image generation processors 86 for processing the image data for printing by printer section 8; dispatch processor PWB 70-9 having dispatch processors 88, 89 for controlling transmission of data to and from printer section 8; and boot control-arbitration-scheduler PWB 70-10.

Referring to FIG. 6, jobs are programmed in a Job Program mode in which there is displayed on touchscreen 62 a Job Ticket 150 and a Job Scorecard 152 for the job being programmed. Job Ticket 150 displays various job selections available for programming, while Job Scorecard 152 displays the basic instructions to the system for printing the job. Various Job Ticket types are provided, with access by means of Job Types and Tickets icon 157.

Job Tickets 150 have three programming levels, referred to as "Job Level", "Basic", and "Special", each having a series of icons for accessing the various programming selections available at that level. Each programming level has a Scorecard 152 associated with it so that on activation of a particular job level or of a specific icon, the appropriate Scorecard is displayed on touchscreen 62.

As described, print jobs may be derived from multiple sources, i.e., jobs scanned in using scanner 6 for printing; jobs scanned in, stored, and then edited or added to for printing later; jobs remotely scanned in and submitted to the system as, for example, through net 5 (FIG. 2); jobs remotely developed and then submitted to the system for printing, etc.

Referring to FIGS. 7–17, a technique for using an "electronic light table" in the printing system 2 (FIG. 1 and 2) is shown in detail. Referring specifically to FIG. 7, an overview of the technique is discussed. At subroutine 200, a display is constructed in which two or more electronic pages of an electronic document(s) are positioned in overlapping relationship with respect to one another on the screen display 62 (FIG. 1). As a result of displaying the pages in overlapping relationship, the pages appear to be in an electronic stack with each page having a transparent background so that none of the images in the stack are obscured by the opacity of the overlying page(s). As shown in FIG. 7, and discussed in further detail below, various functions such as searching and editing can be performed relative to the stack. In one aspect of the technique, selected pages in the stack can be searched by way of subroutine 202 (steps 202a and 202b) and, in one example, artifacts are located in selected regions. In another related aspect of the technique, one or more images are edited via subroutine 204 (steps 204a and 204b) while searching criteria can be revised to facilitate further editing (query 206). As follows from query 208, the display can be revised for further searching and/or editing of the document.

Referring to FIGS. 7 and 8, a first part of the subroutine 200 for constructing a display is discussed in further detail. Initially (steps 210 and 212) the user makes several display selections by use of the user interface 52 (FIGS. 2 and 4). As shown in conjunction with step 212, a screen operator is provided with a wide variety of selections. As will be appreciated, the display options shown in FIG. 8 are merely exemplary of the many features which could be provided for facilitating use of the preferred electronic light table. First, the operator is provided with the opportunity to display a selected primary page as well as a group of additional contiguous or noncontiguous pages or an enumerated list of additional noncontiguous pages. Selection of pages is facilitated by use of a selector (implemented with a selection application) of the type shown in U.S. Pat. No. 5,164,842 to Gauronski et al., the pertinent portions of which are incorporated herein by reference. It is also contemplated that a variation of the Gauronski selector could be used to enumerate a list of selected pages.

It should be recognized that the technique of the preferred embodiment permits a large number of pages to be stacked behind the primary page in such a manner that the image of the primary page appears to be superposed on the image of the page behind it, the image of the page behind the primary page appearing to be superposed on the image of the page behind it and so on. This stacking effect can be seen partially in FIG. 9 and more fully in FIG. 12. It will be noted that each image appears to be disposed on a transparent background so that the overlapping images are not obscured by image background. In the discussion below, pages disposed in overlapping relationship will be referred to as an "electronic stack". With the use of conventional overlay capabilities, which are available on a wide variety of electronic reprographic products, it is conceivable that a sizable group of electronic pages could be grouped in a given electronic stack.

Second, the operator is provided with a choice as to whether an editing template is to be displayed —the utility of the template will be discussed in further detail below. Third, the operator can choose to view a displayed electronic stack from the front or back. Fourth, an image fade coefficient can be developed for the images in the electronic stack. As will appear, the fade coefficient serves to provide "depth" to the electronic stack so that the position of an image in the electronic stack can be perceived appropriately. Finally, an appearance factor can be assigned to differentiate page sides.

In response to making an image fade coefficient selection at step 212, a dedicated application, by way of step 214, determines the number of images to be displayed simultaneously on display 62 and the number of display levels (L) to be assigned those displayed pages. The value of L varies as a function of the number of pages in the electronic stack of pages to be displayed and the number of gray levels provided by the display for the electronic stack. For example if the display includes 8 levels and the number of pages to be displayed is 8 then a distinct gray level can be assigned to each pages.

Assuming an input model in which pages are spooled until they are to be decomposed (also referred to as interpreted or "ripped"), the images are decomposed at step 216. If only side 1 of each image is to be displayed (at step 218), then the process proceeds to a second part of the subroutine 200 shown in FIG. 11; otherwise, the process determines (at step 222) if viewing of the pages, as they appear in an electronic stack on the screen display 62, is to be from the back or the front. If the electronic stack is to be viewed from the back (step 224), then each side 1 image is rotated about its vertical axis (in other words, appropriate x-axis positional changes are effected); otherwise, if the electronic stack is to be viewed from the front (step 226), then each side 2 image is rotated about its vertical axis.

Referring to FIG. 9, a more comprehensive understanding of the significance of step 226 can be obtained. In particular, the image of a side 2 (shown as an "R") is rotated so that it can be positioned "behind" the image of side 1. This sort of overlay is particularly advantageous for demanding duplex printing. In such demanding duplex printing it is desired that front and back side images have a preferred relationship. This can be seen in a telephone directory where front and back header borders are commonly registered relative to one another. As should be recognized, side 1 images and side 2 images can become misregistered during, for example, an image capture operation. As follows from the display of FIG. 9, this misregistration can be eliminated readily with the technique of FIG. 8.

Referring step 228 of FIG. 8, it is assumed, for the ease of explanation, that the operator seeks to distinguish sides from one another through employment of the side specific appearance factor. In one example, the side 1 image is displayed as black while the side 2 image is displayed as red. Referring to FIG. 10, the black side 1 image is designated with the numeral 230 while the red side 2 image is designated by the numeral 232. Accordingly, when the side 1 image is superposed on the side 2 image, the images remain distinct in appearance.

Referring now to FIG. 11, the second part of the subroutine 200 (FIG. 7) is discussed in further detail. It may be desirable, by way of step 236, to apply an appearance factor to the document template referred to in the selection process of step 212. As will be appreciated, the appearance factor may be directed to a distinguishing feature other than a color. For instance, the template may be shown as a shaded or halftone pattern rather than a continuous tone.

Further applying the information selected in step 212, a density reduction factor is calculated, at step 238, for each page in the electronic stack. It has been found that the density reduction factor for a given value of L ($D_{Red}(L)$) can be determined with the following equation:

$$D_{Red}(L) = |P_{Pri} - P_L(i)| \times \text{Fade Coefficient}$$

where, $P_{Pri}$ = Primary Page $P_L(i)$ = Ith Page Behind $P_{Pri}$ (First Page Behind $P_{Pri} = P_L(1)$, Second Page Behind $P_{Pri} = P_L(2)$ and so on)

Fade Coefficient is the Base Incremental Fade to be Applied to Each Page Behind $P_{Pri}$ in the Electronic stack Referring to steps 239 and 240, the density reduction factors for the images are applied to their respective images. For a wide variety of examples, it follows from the above equation that 1×Fade Coefficient is to be applied to the first page behind the primary page, 2×Fade Coefficient is to be applied to the second page behind the primary page, and so on. As will be appreciated, application of the fade coefficient to the displayed pages, when disposed in overlapping relationship, provides the operator with a feeling of depth so that the pages behind the primary page appear to fade gradingly relative to the primary page.

In the preferred embodiment images are provided originally in binary form in which a pixel value of "0" might represent "background" where no "ink" is to be applied, and a "1" might represent "image" where there is to be "ink" applied. Each binary page image is mapped to "gray" image space (i.e. multiple bits per pixel). During this mapping, each pixel whose value indicates the presence of "ink" on a corresponding page will have its gray level value reduced by the amount calculated for the density reduction factor of the corresponding page, and the gray level for all the other pixels (i.e. those pixels whose respective values indicate the presence of no ink), remain unaltered by the density reduction factor. It will be recognized that the term "ink", as used in the above context could relate to inks of any color or useful characteristic (e.g. black, white, gray, cyan, magenta, yellow, red, pink, clear, perfumed, sticky, phosphorescent, etc.). It is also understood that use of other image types (e.g. continuous tone) with the preferred technique would require certain modification of the technique, which modification is believed to be determinable, without undue experimentation, by those skilled in the art.

The electronic stack is generated (step 242) by merging the individual page images, to which density reduction factors have been respectively applied, into a composite image. In the preferred embodiment, the electronic stack is built (i.e. composite image is made) by incrementally adding each page image in an order that starts at the last page in the stack (i.e. back of the stack) and progresses toward the first page in the stack (i.e. front of the stack). In one example, the electronic stack is constructed with the following steps:

1) Initializing a composite gray image in memory;
2) Copying into this composite image the gray image for the last page in the stack as resulted from step 240; 3) Progressing forward in the stack by one page with portions of that page's image being selectively overlaid with the prior built composite image and the corresponding original page image (e.g. the binary form) being used as a selective mask; and
4) Repeating step 3), one page at a time, until all pages in the stack have been masked and overlaid in like manner.

The above-described process, including selective masking and overlaying, is accomplished such that only those gray values in the current gray page image, resulting from step 240 and representing areas with actual image (i.e. ink) determined from the original binary image (i.e. the mask), are allowed to replace the corresponding image areas of the composite image. By this process, the "background" areas of the current page image are ignored and the corresponding areas in the composite image remain unchanged, thus allowing the previous composite image to "show through". Following the merging process associated with step 242, the resultant composite image is, at step 244, displayed on the screen display 62 (FIG. 1).

Referring to FIGS. 12 and 13, it may be useful to search the electronic stack for purposes of locating images, some of which images may be suitable for editing. In the illustrated search technique of FIGS. 12 and 13, the operator, via step 248, designates a search window 250, for application to one or more pages in the electronic stack. This window setting technique, in one example, is based on the principles of the above-mentioned U.S. Pat. No. 5,450,541 to Rourke. Once the window is set, a search technique, based on conventional search processing techniques, is performed (step 252) to determine if a certain type of image data exists in any of the locations defined by the window. Such information may include pixels with a gray level value exceeding a given threshold.

Referring specifically to FIG. 12, this sort of information may include, among others, "speckle marks" 254, hole punch remnants 256 and margin notes 258. After the operator is preferably informed of which pages include the possibly unwanted image information, the corresponding page numbers are stored for potential use in editing. Removal of unwanted marks in an electronic reprographic context can be achieved through use of principles disclosed and taught by U.S. Pat. No. 5,422,743 to Farrell et al., the pertinent portions of which are incorporated herein by reference.

Referring to FIGS. 8 and 14–17, the preferred technique is believed to be particularly well suited for page editing. In the preferred mode of editing, the operator employs the above-mentioned page selector, at step 262, to designate a set of one or more pages upon which an editing operation is to be performed. With reference to the set of pages designated in step 262 the user specifies, at step 264, which operation is to be performed on each page of the designated set. As will appear, in performing these operations, it will commonly be necessary to also set certain parameters. To more fully understand the manner and the nature of these operations, reference is made to the following example.

Referring first to FIG. 9 as well as FIGS. 16 and 17, the feature of image shifting is illustrated. In the illustrated embodiment, the position of the "R" is shifted by an amount inputted, at step 264, for both x and y axes shifts. It will also be understood that a rotation angle of 180° is provided for the rotation of "R" so that a mirror image results. Values may be inputted by one of several known approaches. In one example magnitudes for the parameters are provided by way of the user interface, while in another example, images are shifted by moving a representation of the image on the screen display.

Referring specifically to FIGS. 16 and 17, another horizontal/vertical image shift operation can be seen. In particular, a tab image 266 is shown on an 8 ½×11 page with other text. With the present approach, a tab template including an inner border 268 and an outer border 270 is superposed relative to an electronic page with text. By reference to the template, the tab image can be shifted to its intended tab location area.

Referring to FIG. 15, the present approach contemplates image shifts other than horizontal and/or vertical shifts. In particular, it is conceivable that a back side image could be misregistered relative to a front side image by a skew angle Θ. This misregistration could be remedied by simply aligning the images, as shown in FIG. 15, and rotating the back side image relative to the front side image by the magnitude of Θ.

Referring again to FIG. 14, once the specified common operation has been performed for all of the specified pages of the set of pages, an opportunity to perform another specified operation on the set is, by way of step 274, provided. If no more operations are desired for the current specified set, then the operator is provided, via step 276, with the opportunity to specify another set upon which a common operation can be performed. Specifying another set, as in step 276, may be necessary when one of pages requires one type of operation (e.g. image shift(s)) and another set of pages requires another type of operation (e.g. removing unwanted image data from selected image areas. After all desired editing has been performed, each of the images inverted for viewing and/or editing are reinverted (step 278) and all revised parameters necessary to implement the desired editing, programmed via steps 262, 264, 274 and 276, are stored (step 280) for reference during output of the edited job.

Numerous features appreciated by the above-described embodiments will be appreciated by those skilled in the art:

First, the disclosed electronic light table permits images to be overlapped, with respect to one another, on a screen display to facilitate the shifting of one or more images relative to one or more other images. This is particularly useful in optimizing the setting up of duplex printing. In one example, one image may be shifted horizontally and/or vertically relative to another image so that both images are disposed in a selected registered relationship. In another example, one image may be rotated relative to another image to remedy skewing of one or both of the images.

Second, the images in the electronic stack can be processed to optimize employment of the electronic stack. In one example, a fade coefficient is applied to each image in the electronic stack so that substantially all of the images, when displayed on the screen display, are visually distinct relative to one another and the "depth" of each electronic stack image can be perceived by the user of the screen display.

Finally, the electronic stack is useful in facilitating the editing of an electronic document. In one example, document defects can be located, by way of searching through the electronic document, and removed. In another example, a template may be applied to the electronic stack for, among other things, manipulating one or more images in the electronic stack.

What is claimed is:

1. In a printing machine including a duplex print producing subsystem for producing duplex prints, a memory for storing images, and a user interface with a screen display, the screen display being configured as an electronic light table for displaying multiple images in superposed relationship, a method for producing a duplex print having a first side with a first image disposed thereon and a second side with a second image disposed thereon, each of the first and second sides being represented, in memory, as a separate electronic page, comprising:

a) using the electronic light table configuration, displaying the first and second sides of the electronic page on the user interface screen display simultaneously with the first image being disposed in a first position and the second image being disposed in a second position with the first position being in a different location than the second position;

b) moving the second image, on the screen display, relative to the first image so that the second image is disposed in visual registration with respect to the first position and a selected aligned relationship exists between the first and second images, each of the separate electronic pages having a transparent background so that substantial portions of the second image are visible even when the first image is superposed with respect to the second image; and c) producing a hardcopy duplex print, as controlled by the moving of said b), the hardcopy duplex prints including the first and second images with the first and second images respectively assuming the first position, as set in said b), so that the selected aligned relationship is obtained in the duplex print.

2. The method of claim 1, further comprising rotating each second side image about an axis by 180° so that each back-facing image has the appearance that it would normally possess in a sequentially ordered stack where the first sides face toward the user.

3. The method of claim 1, said b) further includes storing a set of instructions designating that the second image is to be printed, by way of said c), in the first rather than the second position.

4. The method of claim 1, in which the second image is skewed relative to the first image on the screen display, wherein said b) includes electronically rotating the second image relative to the first image for obtaining the selected aligned relationship.

5. The method of claim 1, in which the second image is shifted relative to the first image in one or both of a horizontal direction and a vertical direction on the screen display, wherein said b) includes electronically shifting the second image in one or both of the horizontal and vertical directions for obtaining the selected aligned relationship.

6. In a printing machine including a memory for storing an electronic document with a plurality of electronic pages and a user interface with a screen display, each of the plurality of pages including an image and the screen display being configured as an electronic light table for displaying the plurality of images in superposed relationship, a method for processing each of the plurality of images to optimize the viewing thereof, comprising:

a) assigning an image appearance factor to each of the plurality of images stored in memory;

b) displaying the plurality of images on the screen display simultaneously in a sequential order, each electronic page, except for the last electronic page, being superposed relative to another one of the plurality of electronic pages so that the electronic document is displayed as an electronic stack of electronic pages, and each electronic page having a transparent background so that portions of the image of each electronic page, except the first electronic page, can be seen through each overlying electronic page; and c) applying each image appearance factor assigned in said a) with its corresponding image, in the plurality of image, so that, during said b), each image in the displayed electronic stack is visually distinct from substantially all of the other images in the displayed electronic stack.

7. The method of claim 6, in which each electronic page includes a first side and a second side, and each image appearance factor is selected from one of a first image appearance factor type and a second image appearance factor type, wherein said a) includes assigning a first image appearance factor type factor to each electronic page first side and a second image appearance factor type factor to each electronic page second side.

8. The method of claim 7, wherein said assignment of image appearance factor type factors includes assigning a first color in which each first side image is to be displayed and a second color in which each second side image is to be displayed.

9. The method of claim 6, wherein said a) includes assigning a gray level density to each one of the plurality of images.

10. The method of claim 9, further comprising determining the gray level density to be assigned to each of the plurality of images, said determination permitting each gray level density to vary as a function of a position of a corresponding one of the plurality of images in the electronic stack.

11. In a printing machine including a memory for storing an electronic document with a plurality of electronic pages and a user interface with a screen display, each of the electronic pages including an image and the screen display being configured as an electronic light table for displaying the plurality of images in superposed relationship, a method for processing the electronic document with the electronic light table and a second image stored in the memory, comprising:

a) displaying the plurality of images on the display screen simultaneously in a sequential order, each electronic page, except for the last electronic page, being superposed relative to another one of the plurality of electronic pages and the electronic document being displayed as an electronic stack of electronic pages, and each electronic page having a transparent background so that portions of the image of each electronic page, except the first electronic page can be seen through each overlying electronic page;

b) applying the second image to at least a portion of the displayed electronic stack on the screen display; and c) editing one or more of the electronic pages in the displayed electronic stack on the basis of information obtained by applying the second image to the displayed electronic stack in said b).

12. The method of claim 11, in which the second image comprises a template, wherein said b) includes superposing the template with respect to the displayed electronic stack.

13. The method of claim 12, further comprising locating document defects, in said displayed, with the superposed template.

14. The method of claim 13, wherein said c) is performed automatically and a user is informed, by way of said screen display, which pages may require editing with said c).

15. The method of claim 12, in which the template includes an image placement area, further comprising moving one of the plurality of images for placement in the image placement area.

16. In a printing machine including a duplex print producing subsystem for producing duplex prints, a memory for storing images, and a user interface with a screen display, the screen display being configured as an electronic light table for displaying multiple images in superposed relationship, a system for producing a duplex print having a first side with a first image disposed thereon and a second side with a second image disposed thereon, each of the first and second sides being represented, in memory, as a separate electronic page, comprising:

a) an electronic light table subsystem for displaying the first and second sides of the electronic page on the user interface screen display simultaneously with the first image being disposed in a first position and the second image being disposed in a second position;

b) an image position subsystem for moving the second image, on the screen display, relative to the first image so that the second image is disposed in the first position and is aligned with respect to the first image in a selected aligned relationship, each of the separate electronic pages having a transparent background so that substantial portions of the second image are visible even when the first image is superposed with respect to the second image; and c) said duplex producing subsystem producing a hardcopy duplex print, as controlled by the moving of said b), the hardcopy duplex prints including the first and second images with the first and second images respectively assuming the first position, as set in said b), so that the selected aligned relationship is obtained in the duplex print.

17. The system of claim 16, in which the second image is skewed relative to the first image on the screen display, wherein said moving of the second image includes electronically rotating the second image relative to the first image for obtaining the selected aligned relationship.

18. The system of claim 16, in which the second image is shifted relative to the first image in one or both of a horizontal direction and a vertical direction on the screen display, wherein said moving of the second image includes electronically shifting the second image in one or both of the horizontal and vertical directions for obtaining the selected aligned relationship.

* * * * *